United States Patent [19]
Markowitz et al.

[11] 3,766,432
[45] Oct. 16, 1973

[54] ACTUATOR DRIVE CIRCUITRY FOR PRODUCING DUAL LEVEL DRIVE CURRENT

[75] Inventors: Ivan N. Markowitz; Ernest Paul Lee, both of Oklahoma City, Okla.

[73] Assignee: Honeywell Information Systems Inc., Waltham, Mass.

[22] Filed: Oct. 20, 1972

[21] Appl. No.: 299,554

[52] U.S. Cl............ 317/DIG. 6, 317/137, 317/157, 307/244, 307/270
[51] Int. Cl. .......................................... H01h 47/22
[58] Field of Search................. 317/137, 139, 155.5, 317/157, DIG. 6; 307/244, 270

[56] References Cited
UNITED STATES PATENTS

| | | | |
|---|---|---|---|
| 2,951,186 | 8/1960 | Dickinson...................... | 317/DIG. 6 |
| 3,210,570 | 10/1965 | Brock et al. .................... | 317/137 X |
| 3,624,417 | 11/1971 | Dao ................................. | 307/270 |
| 3,729,655 | 4/1973 | Gratzke ......................... | 317/DIG. 6 |

*Primary Examiner*—John S. Heyman
*Attorney*—Fred Jacob et al.

[57] ABSTRACT

Drive circuitry for a bi-directional solenoid actuator having first and second coils which are energized during mutually exclusive and complementary time periods. Each coil is in circuit with a low impedance bypass which is effective only for a short time after energization of the associated coil. While the bypass is effective, a relatively high current is applied to the coil to seat the solenoid core. When the bypass is rendered ineffective, a relatively lower current is applied to the coil to hold the core in place. The circuitry also includes normally back-biased diodes which are driven to a forward-biased state upon coil de-energization to connect voltage sources to the coil to limit induced voltages to accelerate current decay in the de-energized coil.

6 Claims, 2 Drawing Figures

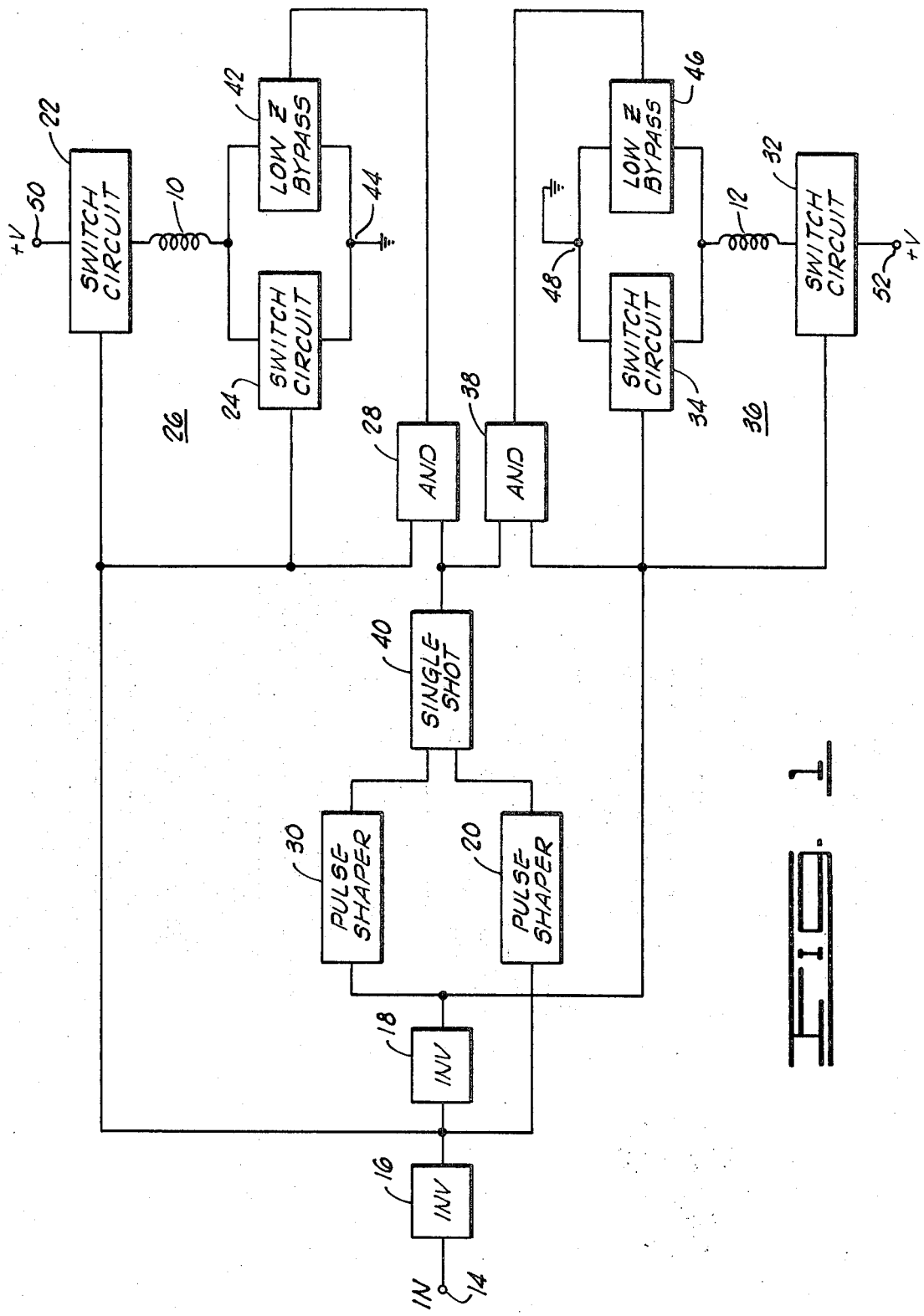

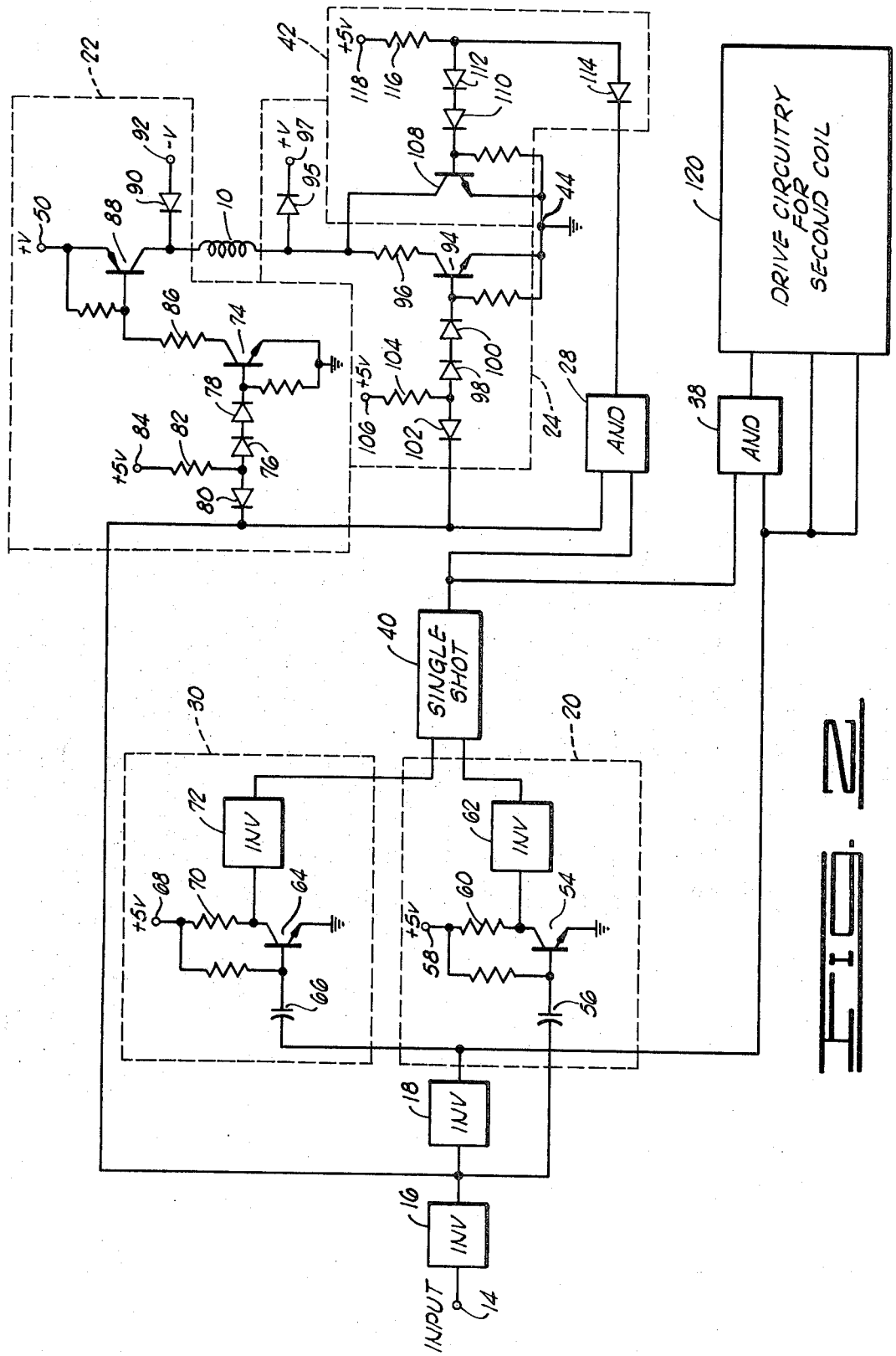

ACTUATOR DRIVE CIRCUITRY FOR PRODUCING DUAL LEVEL DRIVE CURRENT

BACKGROUND OF THE INVENTION

The present invention relates to actuator drive circuits and more particularly to an actuator drive circuit for producing a dual level driving current.

Co-pending application Ser. No. 273,092 filed on July 19, 1972, and assigned to the assignee of the present invention, discloses a solenoid actuator using complementary spring forces and electromagnetic forces to produce a high speed, long throw actuator with low electrical power requirements. The actuator includes a core which can be attracted to either of two extreme positions in a housing by longitudinally spaced electrical coils which are energized during mutually exclusive and complementary periods of time. When one of the two electrical coils is energized, the core is electromagnetically attracted to and held in the extreme position nearest the energized electrical coil. A helical spring is compressed between the end of the attracted core and an interior wall of the housing. When the core is to be driven to the other extreme position, the first coil is de-energized while the second coil is energized. Upon collapse of the electromagnetic field of the de-energized first coil, the stored mechanical force of the compressed helical spring propels the core toward the second coil. The core is electromagnetically attracted toward the second extreme position by the energized second coil. The core must be attracted to and held against an opposing force exerted by a second compressed helical spring.

While the solenoid actuator described briefly above and in more detail in co-pending application Ser. No. 273,092 is capable of high performance, that performance can be realized only with unique drive circuitry. Conventional solenoid actuator drive circuits produce a single level of drive current. While a relatively high current level is needed to initially seat the core of the subject actuator in either of its extreme positions, only a low holding current is needed to hold the seated core against the opposing force exerted by the compressed helical spring. A conventional drive circuit would have to be designed to produce either a high or a low level of drive current at all times. Drive circuitry producing high level drive current would provide high speed performance but power requirements would be high. The power requirements in drive circuits producing low level current would be low but the solenoid actuator would operate at a slower speed.

Moreover, the high speed characteristics of the subject actuator can be realized only if current decay in a de-energized coil occurs rapidly since the electromagnetic field of a coil being de-energized would tend to retard core movement. Prior art solenoid drivers generally have used either relays or transistors in circuits employing a diode or RC network across the deenergized coil to provide a path for decaying current. An induced voltage spike occurring upon coil de-energization can set up relay arcs or can break down transistors. While specially designed relays and high voltage transistors can be used to extend the life cycle of the circuitry, these solutions add to the cost of any solenoid driving circuitry.

SUMMARY OF THE INVENTION

To overcome the problems associated with prior art circuits, drive circuitry which optimizes performance of a solenoid actuator of the type described was invented. The drive circuitry included a pulse generating circuit which is connected to a binary control signal source and which responds to any logic level change in the control signal to generate a primary limited duration pulse. A first logic circuit responds to the concurrence of a primary limited duration pulse and a change in the control signal to a first logic level to generate a first limited duration pulse. A second logic circuit similarly responds to the concurrence of the primary limited duration pulse and a change in the control signal to a second logic level to generate a second limited duration pulse. Each of the two coils in the solenoid actuator operates under the control of its own current control circuit which includes a driving voltage source and a serially connected switching circuit for completing a current path from the voltage source through the coil when the control signal is at a specific logic level. Each of the current control circuits also includes a low impedance bypass circuit connected to the output of one of the logic circuits and in parallel with part of the associated switching circuit. The bypass circuit effectively reduces the impedance of the current path through the associated coil for the duration of the limited duration pulse produced by the associated logic circuit. Thus, a high or seating current is applied to the coil as the core is attracted toward its extreme position and a low or holding current is applied once the core is seated in that position.

DESCRIPTION OF THE DRAWINGS

While the specification concludes with claims particularly pointing out and distinctly claiming that which is regarded as the present invention, further details of one embodiment of the invention along with its further objects and advantages may be more readily ascertained from the following detailed description when read in conjunction with the accompanying drawings wherein:

FIG. 1 is a block diagram of drive circuitry constructed in accordance with the present invention; and FIG. 2 is a more detailed schematic diagram of part of the circuitry shown generally in FIG. 1.

DETAILED DESCRIPTION

Referring to FIG. 1, the circuits shown in block diagram form control the energization of a first coil 10 and a second coil 12. The coils 10 and 12 are energized during mutually exclusive and complementary periods of time to attract a solenoid core (not shown) to opposite extreme positions in a solenoid housing. The logic level of a binary control signal applied at an input terminal 14 determines which of the two coils is energized at any particular time. The binary control signal is applied to a first inverter 16. The inverted form of the binary signal is then applied to a second inverter 18, to a pulse shaper 20, to switching circuits 22 and 24 in current control circuitry 26 associated with the first coil 10, and to one input of a logic AND gate 28.

The output from the second inverter 18 is doubly inverted relative to the original binary control signal and therefore is of the same sense. This output signal is applied to a pulse shaping circuit 30, to switching circuits 32 and 34 in current controlling circuitry 36 associated with the second coil 12 and to one input of a second AND gate 38.

The outputs of the pulse shaping circuits 20 and 30 are applied to a conventional single shot circuit 40 which generates a primary limited duration pulse when triggered by either of the pulse shaping circuits. That is, single shot 40 responds to any change in the logic level of the binary control signal by generating a limited duration pulse. The output of single shot 40 is applied to second inputs of the two AND gates 28 and 38. The output of AND gate 28 provides an input to a low impedance bypass circuit 42 connected in parallel with the switching circuit 24 between the lower end of the first coil 10 and a reference voltage terminal 44. In the particular embodiment illustrated, the reference voltage is assumed to be at ground potential and is referred to as a ground terminal hereafter. The output of the AND gate 38 provides an input to a similar low impedance bypass circuit 46 paralleling the switching circuit 34 between the upper end of the second coil 12 and a reference or ground terminal 48.

In illustrating the operation of the system described above, it is assumed that the second coil 12 is initially energized by a high level binary signal appearing on the input terminal 14. When the coil 12 is to be de-energized and the coil 10 energized, the binary control signal is switched to a low level. The inverter 16 converts the low level binary control signal to a high level signal which when applied to the switching circuits 22 and 24 cuases those circuits to complete a current path from a voltage source 50 through the coil 10 to the ground terminal 44. The inverter 18 produces a low level signal which triggers pulse shaping circuit 30 to produce a limited duration trigger pulse for the single shot 40. The high level primary limited duration pulse produced by the single shot 40 is applied to the AND gate 28 along with the high level signal produced by the inverter 16. The output of the enabled AND gate 28 enables the low impedance bypass circuit 42 for a limited period of time immediately following the change of level of the binary control signal. The low impedance bypass circuit reduces the effective impedance to current flow from the voltage source 50 to the ground terminal 44 and thus causes a high initial current to be applied to the coil 10. This high initial current is used to attract and seat the core of the associated solenoid to the extreme position nearest coil 10. When the single shot 40 has timed out, AND gate 28 and low impedance bypass circuit 42 are disabled. Subsequent current flow is through current switches 22 and 24 which present a higher impedance. As a result, the current applied to the coil 10 is reduced to a level needed to hold the core of the associated solenoid in the extreme position.

The current control circuitry 36 associated with the second coil 12 operates in the same manner as the circuitry associated with the coil 10 but during complementary time periods. When coil 10 is to be de-energized and coil 12 again energized, the binary control signal at the input terminal 14 is switched to a high level. The inverted or low level form of the signal appearing on the output of inverter 16 causes pulse shaping circuit 20 to generate a trigger pulse which is applied to the single shot 40. The primary limited duration pulse on the output of the single shot 40 is applied to the second inputs of the AND gates 28 and 38. AND gate 38 is enabled since its other input is the re-inverted or high level signal produced by the inverter 18. The enabled AND gate 38 causes the low impedance bypass circuit 46 to become effective to provide a low impedance current path for coil 12. The re-inverted signal on the output of inverter 18 causes switching circuits 32 and 34 to complete a current path for coil 12. Thus, when coil 12 is first re-energized, current flows from the voltage source 52 through current switch 32, coil 12, switching circuit 34 and low impedance bypass 46 to the ground terminal 48. After single shot 40 times out to inhibit AND gate 38, the low impedance bypass 46 is disabled causing all current to flow through the switching circuit 34. The removal of the low impedance bypass reduces the level of current applied to the coil 12.

Referring to FIG. 2, elements which are common to both figures are denoted by the same numerals. It can be seen that the pulse shaping circuit 20 consists of a NPN transistor 54 having its emitter terminal connected to ground, its base terminal connected to the output of inverter 16 through a capacitor 54, and its collector terminal connected to a positive voltage source 58 through a collector resistor 60. The collector terminal of the transistor 54 is connected to the input of an inverter 62, the output of which provides one input to the single shot 40. When the binary control signal on the input termina 14 is switched to a high level, the inverted or negative going output of the inverter 16 causes a negative going pulse to be applied to the capacitor 56. The emitter to base junction of the transistor 54 becomes back biased and causes the transistor 54 to be driven into non-conduction for a limited time. An increased collector voltage existing during this limited time is inverted by inverter 62 to cause a negative going pulse to be applied to the single shot 40. Once the capacitor 56 charges, transistor 54 returns to its conductive state to terminate the positive going collector pulse and thus the negative going pulse at the output of inverter 62.

The pulse shaping circuit 30 similarly consists of an NPN transistor 64 having its emitter terminal connected to ground, its base terminal capacitively coupled to the output of the inverter 18 through a capacitor 66, and its collector terminal connected to a positive voltage source 68 through a collector resistor 70. When the binary control signal applied to the input terminal 14 switches to a low level, the negative going signal appearing on the output of inverter 18 causes a negative going voltage to be applied to the base terminal of the transistor 64 through the capacitor 66. The transistor 64 is driven into non-conduction to provide a higher collector voltage at the input to an inverter circuit 72. The inverter 72 provides a negative going pulse which lasts until capacitor 66 charges to allow transistor 64 to resume conduction. When transistor 64 reenters a conductive state, the collector voltage drops and the negative going output of the inverter 72 returns to a normal level.

The switching circuit 22 may be seen to consist of an NPN transistor 74 having a grounded emitter terminal. The base terminal of the transistor 74 is connected to the output of inverter 16 through a pair of voltage limiting diodes 76 and 78 and an oppositely poled diode 80. The junction of the diodes 76 and 80 is connected through resistor 82 to a positive voltage source 84. The collector terminal of the transistor 74 is coupled through resistor 86 to the base terminal of a PNP transistor 88 having its emitter terminal connected directly to the voltage source 50 and its collector terminal connected to the upper end of the coil 10. The collector terminal of the transistor 88 is also connected to the cathode of a diode 90 having its anode connected to a negative voltage source 92.

While coil 12 is energized by a high level binary control signal on the input terminal 14, the low level signal appearing on the output of the inverter 16 allows diode 80 to remain forward biased. The emitter to base junction of the transistor 74 is back biased causing that transistor to remain in a non-conductive state while coil 12 is energized. The high collector voltage of the non-conductive transistor 74 causes the base to emitter junction of the transistor 88 to also be back biased, effectively open circuiting the connection between the voltage source 50 and the upper end of the coil 10.

When coil 10 is to be energized by driving the binary control signal on the input terminal 14 to the low logic level, the positive going signal appearing on the output of the inverter 16 causes diode 80 to be back biased and diodes 76 and 78 to be forward biased. The relatively more positive voltage at the base terminal of the transistor 74 biases that transistor into conduction, thereby reducing its collector voltage. The reduced collector voltage causes the emitter to base junction of the transistor 88 to become forward biased causing that transistor to be driven into conduction, completing the current path from the voltage source 50 through transistor 88 to the upper end of coil 10.

The switching circuit 24 includes an NPN transistor 94 having its collector terminal connected to the lower end of the coil 10 through a current limiting resistor 96, its emitter terminal connected directly to the ground terminal 44, and its base terminal connected through voltage limiting diodes 98 and 100 and through oppositely poled diode 102 to the output of the inverter 16. The common junction of diodes 98 and 102 is connected to the lower end of a resistor 104 having its upper end connected to a positive voltage source 106. Switching circuit 24 further includes a diode 95 having its anode connected to the lower end of coil 10 and its cathode connected to a positive voltage source 97.

When the coil 10 is to be energized, the binary control signal on the input terminal 14 is switched to a low logic level which drives the signal on the output of the inverter 16 to a high logic level. The high logic level signal back biases diode 102 and allows the voltage source 106 to forward bias the base to emitter junction of the transistor 94. Transistor 94, when conducting, and resistor 96 form a current path between the lower end of coil 10 and the ground terminal 44. When coil 10 is to be de-energized, the change in the binary control signal to a high logic level causes diode 102 to be forward biased and diodes 98 and 100 to be back biased which, in turn, causes the base to emitter junction of the transistor 94 to be back biased. Transistor 94 is driven into its non-conductive state to open circuit the current path which included the current limiting resistor 96.

The low impedance bypass circuit 42 associated with coil 10 includes an NPN transistor 108 having its collector terminal connected to the lower end of coil 10, its emitter terminal connected directly to the ground terminal 44, and its base terminal connected through a pair of voltage limiting diodes 110 and 112 and an oppositely poled diode 114 to the output of the AND gate 28. The common junction of the diodes 112 and 114 is connected to the lower end of a resistor 116 having its upper end connected to a positive voltage source 118.

As was explained with reference to FIG. 1, the AND gate 28 is enabled for a short period of time immediately following the energization of the coil 10. During this limited period of time, the high logic level signal on the output of the AND gate 28 back biases the diode 114 to permit the voltage source 118 to forward bias the base to emitter junction of the transistor 108 through the diodes 110 and 112. When its base to emitter junction is forward biased, the transistor 108 conducts to provide a current path parallel to the current path formed by the transistor 94 and the current limiting resistor 96 in the switching circuit 24. The parallel current path reduces the impedance to current flow and consequently results in a higher level of current through the coil 10 as long as transistor 108 conducts.

When single shot 40 times out, AND gate 28 is inhibited and its output drops to a low logic level. The low logic level signal causes diode 114 to be forward biased, allowing diodes 110 and 112 to be back biased. As a result, the transistor 108 is driven into non-conduction, open circuiting the low impedance bypass. Since all current is diverted through the current limiting resistor 96 and a transistor 94 once the low impedance bypass is rendered ineffective, the effective impedance of the coil is increased, thereby reducing the level of current applied to the coil 10. This lower level of current is maintained as long as coil 10 is energized.

To optimize the performance of the actuator when one coil is energized as the other coil is de-energized, the current in the formerly energized coil must be made to decay rapidly so that the remanent electromagnetic field of the coil being de-energized will not retard the acceleration of the core toward the extreme position adjacent the newly energized coil. When coil 10 is energized, the conduction through the transistors 88 and 94 cause the diodes 90 and 95 to be back biased relative to the voltage sources 92 and 97 respectively. When, however, coil 10 is de-energized by driving transistors 88 and 94 into their non-conductive states, the voltage induced across coil 10 causes the diodes 90 and 92 to become forward biased. The forward biasing of these diodes causes the voltage across coil 10 to be limited to the negative and positive values of the voltages produced by the voltage sources 92 and 97 respectively. An initial voltage of 2V is impressed across coil 10 immediately upon de-energization, causing the initial current rate of decay of the coil current to be 2V/L where L is the inductance of the coil.

The drive circuitry for the second coil 12 is identical to that for the first coil 10 and differs only in that it operates in a complementary manner. For that reason, drive circuitry for coil 12 is shown only as a block 120 in FIG. 2.

While there has been described what is thought to be a preferred embodiment of the present invention, modifications and variations will occur to those skilled in the art once they become familiar with the invention. Therefore, it is intended that the appended claims shall be construed as including all such variations and modifications as fall within the true spirit and scope of the invention.

We claim:

1. Drive circuitry for a solenoid actuator having first and second coils energizable during mutually exclusive and complementary periods of time as a function of the level of a binary control signal including:

a. a pulse generating circuit connected to the binary control signal source and responsive to any logic level change in the control signal to generate a primary limited duration pulse;

b. a first logic circuit connected to the output of the pulse generating circuit and in circuit with the control signal source to generate a first limited duration pulse only when the control signal changes to a first logic level;

c. a second logic circuit connected to the output of the pulse generating circuit and in circuit with the control signal source to generate a second limited duration pulse only when the binary control signal changes to a second logic level;

d. a first current control circuit for the first coil comprising i. a first driving voltage source, ii. a first switching circuit connected in series with the first driving voltage source and the first coil, said switching circuit being responsive to the control signal being at its first level to complete a current path from the voltage source through the first coil, and iii. a first low impedance bypass circuit connected to the output of the first logic circuit and in parallel with part of the switching circuit to reduce the impedance of the completed current path for the duration of the first limited duration pulse;

e. a second current control circuit for the second coil comprising i. a second driving voltage source, ii. a second switching circuit connected in series with the second driving voltage and the second coil, said switching circuit being responsive to the control signal being at its second level to complete a current path from the voltage source through the second coil, and iii. a second low impedance bypass circuit connected to the output of the second logic circuit and in parallel with part of the second switching circuit to reduce the impedance of the completed current path for the duration of the second limited duration pulse.

2. A control circuit as recited in claim 1 wherein each of said first and second driving voltage sources has a first polarity and each of said first and second switching circuits further includes:

a. a decay voltage source having a second polarity;

b. a first diode having one terminal connected to the end of the coil adjacent said driving voltage source and the other terminal connected to the decay voltage source, said first diode being normally back biased;

c. a second diode having one terminal connected to the other end of the coil and the other terminal connected to the driving voltage source, said second diode also being normally back biased;

d. said first and second diodes being forward biased by the voltage induced across the coil immediately following coil deenergization.

3. A control circuit as recited in claim 1 wherein each of said first and second switching circuits further comprises:

a. a first transistor having its emitter and collector terminals connected in series between the driving voltage source and one end of the associated coil and its base terminal connected in circuit with the binary control signal source;

b. an impedance connected in series at the other end of the coil; and c. a second transistor having its emitter and collector terminals connected in series between the other end of the coil and a reference voltage terminal and its base terminal connected in circuit with the associated logic circuit.

4. A control circuit as recited in claim 2 wherein each of said first and second switching circuits further comprises:

a. a first transistor having its emitter and collector terminals connected in series between the driving voltage source and one end of the associated coil and its base terminal connected in circuit with the binary control signal source;

b. an impedance connected in series at the other end of the coil; and c. a second transistor having its emitter and collector terminals connected in series between the lower end of the impedance and a reference voltage terminal and its base terminal connected in circuit with the binary control signal source.

5. A control circuit as recited in claim 3 wherein each of said low impedance bypass circuits comprises a third transistor having its emitter and collector terminals connected in series between said other end of said coil and the reference voltage terminal and its base terminal connected to the output of the associated logic circuit, said third transistor being biased into conduction for the duration of the limited duration pulse produced by said associated logic circuit.

6. A control circuit as recited in claim 4 wherein each of said low impedance bypass circuits comprises a third transistor having its emitter and collector terminals connected in series between said other end of said coil and the reference voltage terminal and its base terminal connected to the output of the associated logic circuit, said third transistor being biased into conduction for the duration of the limited duration pulse produced by said associated logic circuit.

* * * * *